Patented Aug. 1, 1939

2,168,138

UNITED STATES PATENT OFFICE 2,168,138

METHOD OF MANUFACTURING CHICKEN FEED AND THE COMPOSITION OF THE SAME

Hyosuke Sakurai, Ohtakamachi, Chita District, Aichi Prefecture, Japan

No Drawing. Application November 18, 1936, Serial No. 111,486

4 Claims. (Cl. 99—4)

My invention relates to improvements in a method of manufacturing chicken foods and, more particularly, to so-called chick-mashes of special composition containing as essential ingredients corn (maize), dried raw herring, middlings of wheat and as sub-ingredients bran, charcoal, oyster-shell, kelp meal and rape seed cake. The invention has for its object to provide chicken foods which will give the best nourishing effects to chickens and which may be manufactured at comparatively low cost.

Almost all chicken foods obtainable at present in the market are not best adapted for promoting the growth of young chickens in every respect or for giving them good taste, nourishment, or a sufficient amount of all necessary vitamins, or proper medical and sanitary effects.

After long years of experiments the inventor has found the most desirable proportion and composition of chicken foods which will give results superior to all other known chicken foods and the method of manufacturing the same. The most important feature of this invention is based on the discovery of the great nourishing effect of dried raw herring which contains a sufficient amount of vitamins in undeteriorated condition. This herring is mixed with corn (maize) in large quantities, i. e., such as up to 60% of the total ingredients.

The powdered chicken foods or so-called chick-mash of this invention consists of:

|  | Percent |
|---|---|
| Corn (preferably yellow corn) | 30 to 60 |
| Dried raw herring | 5 to 25 |
| Middlings of wheat, (barley or oats) | 10 to 20 |
| Bran | less than 30 |
| Rape seed cake | less than 10 |
| Kelp meal | less than 5 |
| Oyster shell | less than 4 |
| Charcoal | less than 2 |

In manufacturing the chicken foods of this invention, the most important and difficult procedure is to crush or mash the dried raw herring into small pieces or meal since the dried raw herring contains a considerable amount of oil and is so greasy that it cakes into a stick mass if it is ground according to ordinary processes thereby making it impossible to obtain small pieces or powders. The inventor has succeeded in crushing the dried raw herring into small pieces or powders by cutting or breaking the herring into a suitable size and mixing to it a proper amount of crushed corn and then grinding or mashing the mixture into the desired fine pieces. In such a process, the corn absorbs the oily matters contained in the dried raw herring so that the grinding operation can be accomplished without caking troubles. All other materials can easily be obtained in a powdered form or small pieces as desired. Accordingly, the chicken foods can easily be manufactured by mixing the powders and small pieces according to the above mentioned percentages. As an example, the following compositions will give splendid nourishing effects for chickens in different courses of growth:

|  | Percent | Percent | Percent |
|---|---|---|---|
| Corn | 55 | 40 | 60 |
| Dried raw herring | 17 | 10 | 20 |
| Middlings of wheat | 15 | 10 | 20 |
| Bran | 5 | 23 | — |
| Rape seed cake | 3 | 10 | — |
| Kelp meal | 2 | 3 | — |
| Oyster shell | 2 | 3 | — |
| Charcoal | 1 | 1 | — |

The most important element in the chicken foods of this invention is the dried raw herring. Other fishes, such as sardines, halibuts or flat-fishes, are not as effective as the dried raw herring since the sardines, halibuts etc. contain less oil and vitamins A, D and E. Because of this the yolk of an egg laid by a chicken fed with the food containing halibut, etc., contains less vitamins A, D and E than yolks obtained with the food of this invention. Fish refuses, such as sardine cake, can not be used in this invention since such material is not made of raw fish, but has been steamed and the oil taken off so that it does not contain a sufficient amount of vitamins A, D and E. The raw herring, dried without steaming or other chemical treatments, is the best nourishing element which the inventor has discovered by actual experiments. Another characteristic of the chicken foods of this invention lies in the fact that animal bones, such as boiled and ground ox bones, are not used since such treated bones are not effective owing to the lack of glue which is essential to make the frame of the chicken elastic.

The chicken foods manufactured by the above method and containing the essential ingredients in the proportion as above specified is proved to give a 20% better developmental condition to young chickens if compared with all other chick-foods obtainable at present in the market.

Although in the present invention edible dried herring flesh may be used, the expense is so great that it is not feasible to use it. The scrap of herring, after the flesh is cut off for food, can be obtained at a very low cost. The dried raw herring scrap, so-called dried body herring, may be used most economically in this invention as it contains a sufficient quantity of vitamins A, D and E in undeteriorated condition. The dried body herring powders crushed by the special method of this invention have a sweet smell and taste which is most desirable for chickens and has a beneficial effect in promoting their appetite. The corn (maize), especially the yellow corn, contains sufficient vitamins A, B and D and is effective for obtaining yellow billed and legged chickens having bright feathers. Moreover the present chicken food containing the dried body herring powder and a large amount of yellow corn powder has the splendid effect of absolutely preventing leg-weakness diseases which occur unavoidably in baby chicks after about four weeks, if fed with the ordinary chick-foods on the market. The middlings of wheat, barley or oats are added as they can be ground into very fine powders and uniformly distributed in the chicken-mash. Such powders have a special sweetness which promotes the appetite of the chicks. Bran is used as a fibrous element to strengthen the intestines. Kelps and similar sea weeds are used for supplying the iodine. Oyster shell and charcoal are used as a calcium agent and for gas absorption and other curing purposes, respectively, according to the known arts. The rape seed cake contains albumen and is effective for giving its adherent a sweet smell to improve the taste for chickens.

The mixture of this invention without sub-ingredients is most effectively applied to quickly fatten spring chickens without giving them greens and without their being affected by parasites since other raw foods are not given to them. Even if the chickens are raised in a chamber excluding the sunlight they are not subjected to poor-growth if fed with the chicken foods of this invention.

While I have described herein certain embodiments which my invention may take and certain combinations of ingredients which are deemed most advantageous it will be apparent to those skilled in the art that variations in these combinations may be made and that various modifications of the invention may be practised all without departing in any way from the spirit or scope of the invention.

I claim—

1. A method of manufacturing chicken foods, such as co-called chick mashes, chick starters and the like, characterized in that dried raw herring is mashed and ground together with maize so that the dried raw herring may be crushed into small pieces without caking by the aid of maize and the ground mixture is mixed with a proper amount of middlings of wheat, barley or oats as the essential ingredients.

2. A method of manufacturing chicken foods comprising grinding the dried raw herring together with maize and mixing with it the middlings of wheat, barley or oats, bran, rape seed cake, kelp meals and other similar sea weeds, oyster shell and charcoal as sub-ingredients.

3. A chicken feed consisting of intimately mixed ground maize and dried raw herring in the proportion of from 40 to 60 per cent of the entire mixture of ground corn, 10 to 20 per cent of the entire mixture of ground dried raw herring and smaller percentages of wheat middlings, bran, rape seed cake, kelp meal, oyster shell powder and substantially 1% of charcoal dusts.

4. A chicken feed consisting of intimately mixed ground maize and dried raw herring in the proportion of from 40 to 60 per cent of the entire mixture of ground corn, 10 to 20 per cent of the entire mixture of ground dried raw herring and the remainder of wheat middlings.

HYOSUKE SAKURAI.